US007371458B2

(12) United States Patent
Masada et al.

(10) Patent No.: US 7,371,458 B2
(45) Date of Patent: *May 13, 2008

(54) HIGH-WEATHERABILITY IRON NITRIDE-BASED MAGNETIC POWDER AND METHOD OF MANUFACTURING THE POWDER

(75) Inventors: Kenji Masada, Okayama (JP); Takayuki Yoshida, Okayama (JP); Takafumi Amino, Okayama (JP)

(73) Assignee: Dowa Electronics Materials Co., Ltd., Tokyo (JP)

( * ) Notice: Subject to any disclaimer, the term of this patent is extended or adjusted under 35 U.S.C. 154(b) by 101 days.

This patent is subject to a terminal disclaimer.

(21) Appl. No.: 11/192,178

(22) Filed: Jul. 29, 2005

(65) Prior Publication Data

US 2006/0024501 A1 Feb. 2, 2006

(30) Foreign Application Priority Data

Aug. 2, 2004 (JP) ............................ 2004-225822

(51) Int. Cl.
*B32B 5/16* (2006.01)
*B05D 3/02* (2006.01)

(52) U.S. Cl. ...................... 428/403; 427/215; 427/216; 427/372.2; 428/404

(58) Field of Classification Search ................ 428/403, 428/404; 427/212, 215, 216, 372.2
See application file for complete search history.

(56) References Cited

U.S. PATENT DOCUMENTS 5,605,752 A * 2/1997 Matsubayashi ............. 428/323
6,964,811 B2 * 11/2005 Kishimoto et al. ......... 428/402

FOREIGN PATENT DOCUMENTS

JP 2000-277311 10/2000
WO 03/079333 A1 9/2003

* cited by examiner

*Primary Examiner*—H. T Le
(74) *Attorney, Agent, or Firm*—Clark & Brody

(57) ABSTRACT

A high-reliability iron nitride-based magnetic powder with markedly improved weatherability with respect to deterioration over time of the magnetic properties in fine particles smaller than 25 nm is formed by adhering one or more of the elements Si and P to the surface of an iron nitride-based magnetic powder constituted primarily of $Fe_{16}N_2$ with an average grain size of 25 nm or less, where the total content of Si and P in the magnetic powder may be 0.1% or greater as an atomic ratio with respect to Fe. In particular, the invention provides an iron nitride-based magnetic powder such that the value $\Delta H_c$ as defined by Equation (1) below is 5% or less and the value $\Delta\sigma_s$ as defined by Equation (2) below is 20% or less.

$$\Delta H_c=(H_{c0}-H_{c1})/H_{c0}100 \quad (1)$$

$$\Delta\sigma_s=(\sigma_{s0}-\sigma_{s1})/\sigma_{s0}100 \quad (2)$$

Here, $H_{c1}$ and $\sigma_{s1}$ are the coercivity and saturation magnetization, respectively, of the magnetic powder after being kept for one week at a constant temperature and constant humidity of 60° C. and 90% RH. $H_{c0}$ and $\sigma_{s0}$ are the coercivity and saturation magnetization of the magnetic powder before being kept at constant temperature and constant humidity.

4 Claims, 2 Drawing Sheets

HIGH-WEATHERABILITY IRON NITRIDE-BASED MAGNETIC POWDER AND METHOD OF MANUFACTURING THE POWDER

CROSS-REFERENCE TO RELATED APPLICATIONS

This application claims priority under 35 U.S.C. 119 of Japanese Application No. 2004-225822 filed Aug. 2, 2004.

BACKGROUND OF THE INVENTION

1. Field of the Invention

The present invention relates to an iron nitride-based magnetic powder used in high-density magnetic recording media, and particularly to one that has superior weatherability such that the deterioration over time of its magnetic properties is mitigated, and to a method of manufacturing the powder.

2. Background Art

It is desirable for recent magnetic recording media to have high recording densities, and in order to achieve this goal, the recording wavelengths are becoming shorter and shorter. Unless the magnetic particles are of a size considerably smaller than the length of a magnetic domain recorded by means of a short-wavelength signal, recording becomes effectively impossible since a clear magnetization transition state cannot be created. Thus, the magnetic powder is required to have a particle size much smaller than the recording wavelength.

In addition, in order to achieve higher recording densities, the resolution of the recording signal must be increased and to this end, noise in the magnetic recording medium must be reduced. Noise is greatly affected by the particle size, with noise becoming lesser the finer the particle. Accordingly, magnetic powders for use in high-density recording are required to have very small particle sizes on this point also.

However, as particles become finer, it becomes more and more difficult for the particles to remain present as single independent particles, and there is a problem in that even in the case of the metal magnetic powder typically used for data storage, if the particle size becomes extremely fine, sintering readily occurs during reduction in the manufacturing process. If sintering occurs, then the particle volume becomes large and this becomes a source of noise, leading to deleterious effects such as deterioration in dispersibility and a loss of surface smoothness when made into tape. Magnetic powder suitable for high-density recording media must have good magnetic properties as a magnetic material, but in addition, when being made into tape, its powder properties, namely the average grain size, grain-size distribution, specific surface area, TAP density, dispersibility and the like become important.

Up until now, iron nitride-based magnetic powders with a $Fe_{16}N_2$ phase as the main phase have been known as magnetic powders suited for high-density recording media that have superior magnetic properties, as disclosed in JP 2000-277311A (Patent Document 1) and WO 03/079333 A1 (Patent Document 2). For example, Patent Document 1 discloses an iron nitride-based magnetic substance with a large specific surface area that exhibits a high coercivity ($H_c$) and high saturation magnetization ($\sigma_s$), teaching that the synergistic effect of the magnetocrystalline anisotropy of the $Fe_{16}N_2$ phase and the increased specific surface area of the magnetic powder allows high magnetic properties to be obtained regardless of the shape morphology. Patent Document 2 recites a magnetic powder that is improved over that of Patent Document 1, being a magnetic powder that substantially comprises a spherical or oval magnetic powder of rare earth-iron-boron, rare earth-iron, or rare earth-iron nitride, teaching that if tape media are fabricated using these powders, then superior properties are obtained. Among these powders, despite being fine particles on the order of 20 nm, the rare earth-iron nitride-based magnetic powder with the $Fe_{16}N_2$ phase as the main phase has a high coercivity of 200 kA/m (2512 Oe) or greater, and the specific surface area found by the BET method is small, so the saturation magnetization is high and its storage stability is also good. It is recited that by using these rare earth-iron nitride-based magnetic powders, the recording density of coating-type magnetic recording media can be dramatically increased.

The method of manufacturing these rare earth-iron nitride-based magnetic powders is an ammonia nitriding method wherein: the rare earth-iron nitride-based magnetic powder is formed by reducing particles of magnetite with a rare earth and one or both of Al or Si adhered to the surface of the particle, and then nitriding with $NH_3$ gas. Because of the large magnetocrystalline anisotropy of the $Fe_{16}N_2$ phase induced by this nitriding, it is possible to obtain magnetic powders suited to high-density recording media, or namely magnetic powders consisting of fine particulates that have high $H_c$, high $\sigma_s$ and other properties.

However, as recited in Patent Documents 1 and 2, magnetic powders containing the $Fe_{16}N_2$ phase that have both a small average grain size and superior magnetic properties have been demonstrated to have good potential as magnetic materials, but nothing is disclosed regarding their properties as powders, e.g., their grain size distribution, dispersibility and the like, so it is difficult to determine whether or not they are magnetic powders suitable for the coating-type magnetic recording media used. Even magnetic powders with superior magnetic properties, if they bring the tape to poor surface smoothness, for example, would ultimately not be suitable for use in coating-type magnetic recording media.

In Patent Document 2, at the time of producing the $Fe_{16}N_2$ phase that has a large magnetocrystalline anisotropy, Si, Al and rare earth elements (including Y) are adhered to the particle surface so as to produce fine particles that do not undergo sintering. However, with this method of preventing sintering by adhesion, in the case that the conditions for adhesion are inadequate, the degree of adhesion of the sintering-preventative agent may be different for each particle, so there may be places where sintering is prevented where adhesion is adequate and places where sintering occurs where adhesion is poor. As a result, there is a problem in that the grain size distribution of the powder thus obtained is poor. In fine particles in particular, the particles agglomerate readily and tend to behave as an aggregate, so uneven adhesion readily occurs. A poor grain size distribution may cause deterioration of the tape surface properties, or even deterioration of the electromagnetic transduction properties.

As a result of various studies conducted by the present inventors in order to solve these problems, the inventors discovered that if goethite in solid solution with Al is used as the starting material for the manufacture of iron nitride-based magnetic powder, then one can obtain an iron nitride-based magnetic powder constituted primarily of $Fe_{16}N_2$ that has superior magnetic properties suited to high-density magnetic recording media, a narrow grain size distribution, fine particles with an average grain size of 20 nm or less that do not sinter and good dispersibility when made into tape, and thus the inventors filed Japanese patent application number 2004-76080.

SUMMARY OF THE INVENTION

As pointed out above, it is now possible to provide a high-performance iron nitride-based magnetic powder that is suitable as a high-density magnetic recording material, but in the future it will become necessary to give the powder even better "weatherability" so that the deterioration in magnetic properties over long-term use is decreased. For example, if an iron nitride-based magnetic powder that undergoes major changes over time is used to make computer storage tape, a phenomenon occurs wherein the $H_c$ and $\sigma_s$ decrease with the passage of time. If the $H_c$ decreases, then the information recorded with that magnetic powder can no longer be kept, so there is a problem in that the information will disappear. In addition, if the $\sigma_s$ decreases, the information recorded with that magnetic powder can no longer be read, and as a result there is a problem in that the information is lost. Even if it is possible to record at high recording densities, it would be a fatal flaw for storage tape were the information to disappear, so having superior "weatherability" is an extremely important condition for a magnetic powder.

It is worth noting that the "weatherability" has a large correlation to the average grain size, so it tends to worsen as the average grain size becomes smaller. As described above, increasingly fine particles are required in order to achieve high recording densities, but because of the tradeoff relationship between "fine particles" and "weatherability," breakthrough art that achieves both goals becomes necessary. Regarding fine particles, noise becomes large if the average grain size exceeds 25 nm, so a problem occurs wherein the C/N ratio of the tape medium worsens. One would want to use fine particles with an average grain size of 20 nm or less if possible. Regarding weatherability, if the $\Delta H_c$ exceeds 5% or the $\Delta\sigma_s$ exceeds 20%, then there is a risk of data loss, so this is not preferable from the standpoint of the practical use of tapes. Accordingly, the situation is such that there is a strong need to establish technology that gives iron nitride-based magnetic powder with an average grain size of 25 nm or less, or an average grain size of 20 nm or less if possible, and weatherability such that the $\Delta H_c$ is less than 5% and the $\Delta\sigma_s$ is less than 20%.

An object of the present invention is to develop and provide a novel iron nitride-based magnetic powder that maintains the various aspects of performance of the iron nitride-based magnetic powder disclosed in Japanese patent application number 2004-76080 mentioned above, and also has markedly improved weatherability.

As a result of performing various studies, the present inventors discovered that even with an iron nitride-based magnetic powder (namely, one constituted primarily of iron nitride) with a small average grain size of 25 nm or less, or even 20 nm or less, by adhering a substance containing one or more of the elements Si and P to the surface of the powder particles, it is possible to achieve a marked improvement in weatherability.

The iron nitride-based magnetic powder with improved weatherability provided by the present invention comprises: an iron nitride-based magnetic powder constituted primarily of $Fe_{16}N_2$ with an average grain size of 25 nm or less, or particularly an average grain size of 20 nm or less, wherein one or more of the elements Si and P are adhered to the surface of the powder. The total content of Si and P in the magnetic powder may be made 0.1% or greater as an atomic ratio with respect to Fe. The adhered substance containing Si and P may contain some or all of the identified elements in the form of oxides or other compounds.

In addition, the present invention provides the aforementioned iron nitride-based magnetic powder with a substance containing Si or P adhered such that the value $\Delta H_c$ as defined by Equation (1) below is 5% or less and the value $\Delta\sigma_s$ as defined by Equation (2) below is 20% or less.

$$\Delta H_c=(H_{c0}-H_{c1})/H_{c0}100 \quad (1)$$

$$\Delta\sigma_s=(\sigma_{s0}-\sigma_{s1})/\sigma_{s0}100 \quad (2)$$

Here, $H_{c0}$ and $\sigma_{s0}$ are the coercivity (kA/m) and saturation magnetization ($Am^2/kg$), respectively, of the iron nitride-based magnetic powder immediately after adhesion according to the present invention. $H_{c1}$ and $\sigma_{s1}$ are the coercivity (kA/m) and saturation magnetization ($Am^2/kg$), respectively, of the iron nitride-based magnetic powder after adhesion and after being kept for one week (e.g., 24 7=168 hours) in a constant-temperature, constant-humidity vessel at 60° C. and 90% RH. When magnetic powder is kept in a constant-temperature, constant-humidity vessel, one may adopt a method wherein 2 g of the powder in question is placed uniformly in glass vessels to a depth of 2-4 mm, and these vessels are placed entirely in a constant-temperature, constant-humidity vessel so that they are exposed to an environment at 60° C. and 90% RH.

Such iron nitride-based magnetic powder with improved weatherability can be manufactured by a method comprising:

[1] a step of taking an iron nitride-based magnetic powder constituted primarily of $Fe_{16}N_2$ with an average grain size of 25 nm or less and adhering one or more of the elements Si and P to the surface of the powder such that the total content of Si and P in the magnetic powder after adhesion is 0.1% or greater as an atomic ratio with respect to Fe, and

[2] a step of heat-treating the powder obtained in step [1] above at 80-200° C. in an inert-gas atmosphere.

By means of the present invention, it is possible to provide iron nitride-based magnetic powder for use as a high-density magnetic recording medium that is made into fine particles with an average grain size of 25 nm or less or 20 nm or less, that are given superior "weatherability" or namely the deterioration over time of the magnetic properties when in long-term use is markedly mitigated. Accordingly, the present invention contributes to the improved durability and reliability of high-density magnetic recording media and the electronic equipment in which it is installed.

DESCRIPTION OF THE PREFERRED EMBODIMENT

Figure 1:
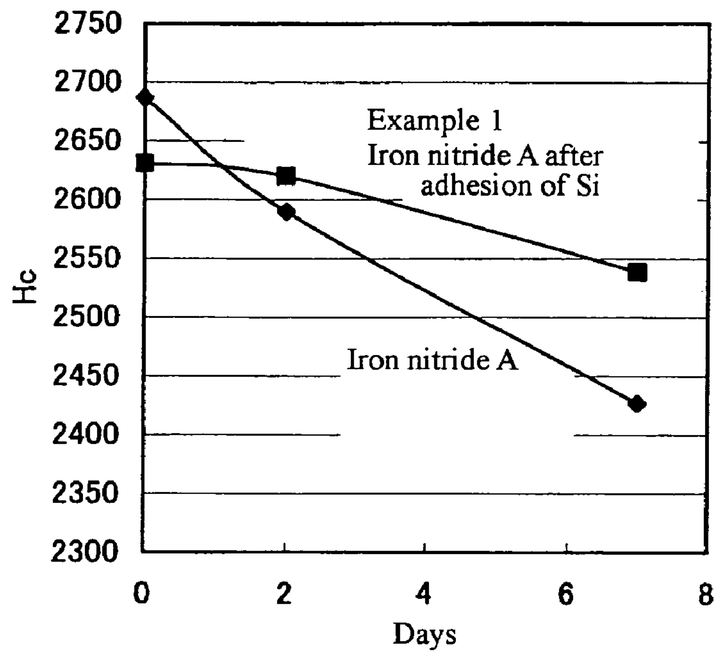
FIG. 1 is a graph of the deterioration over time of H, when acceleration testing is performed in a constant-temperature, constant-humidity chamber, both on the iron nitride-based magnetic powder prior to the Si adhesion used in Example 1 (iron nitride A) and the iron nitride-based magnetic powder after Si adhesion produced in the same Example.

As set out above, the iron nitride-based magnetic powder according to the present invention consists of fine particles with an average grain size of 25 nm or less or 20 nm or less, having a substance (e.g., an oxide) containing Si or P that is adhered to its surface in a stage after nitriding. It is not clear at the present point in time why the weatherability of such powder is markedly improved. However, in comparison to conventional iron nitride-based magnetic powder made by a manufacturing method wherein Si or the like is adhered prior to nitriding, the iron nitride-based magnetic powder according to the present invention wherein Si or P is adhered after nitriding exhibits greatly improved weatherability in the region at a grain size of 25 nm or less, so the powder according to the present invention clearly has a structure that differs from that of the prior art.

The superior weatherability that is a distinctive property of the iron nitride-based magnetic powder according to the present invention can be confirmed by means of acceleration testing where it is kept in a constant-humidity, constant-temperature vessel. Specifically, the weatherability can be evaluated by placing the powder in question in a constant-humidity, constant-temperature vessel, performing an acceleration test where it is kept for one week at 60° C. and 90% RH, and then measuring the coercivity $H_{c1}$ and saturation magnetization $\sigma_{s1}$ after the acceleration test, and comparing these values with the coercivity $H_{c0}$ and saturation magnetization $\sigma_0$ before the acceleration test. Specifically, the values of $\Delta H_c$ as defined by Equation (1) above and the value Au, as defined by Equation (2) above are investigated. With the iron nitride-based magnetic powder according to the present invention, superior weatherability where $\Delta H_c$ is 5% or less and $\Delta\sigma_s$ is 20% or less is obtained.

Here follows a detailed description of the method of obtaining the iron nitride-based magnetic powder with improved weatherability according to the present invention.

The iron nitride-based magnetic powder to be subjected to nitriding is subject to no particular limitations other than being required to have an average grain size of 25 nm or less or preferably 20 nm or less, but the iron nitride-based magnetic powder disclosed in Japanese patent application 2004-76080 described above is particularly suitable in that it is a powder that suppresses sintering, has a good grain-size distribution and good dispersibility, and has superior uniformity at the time that the adhesion process is performed.

The iron nitride-based magnetic powder with the Si or P adhered can be obtained by the method of dispersing the iron nitride-based magnetic powder serving as the starting material in water, adding a pH-adjusting agent, and then adding the Si-containing substance or P-containing substance that will later become the adhered material. Alternately, the iron nitride-based magnetic powder can be dispersed in water and the Si-containing substance or P-containing substance to become the adhered material can be added first and the pH-adjusting agent be added later. It is also preferable for the liquid to be stirred when the Si-containing substance, P-containing substance and pH-adjusting agent are added. A ripening period where the liquid is kept under stirring may also be provided. This ripening period can serve to control the amount adhered, since more Si or P will adhere with longer ripening period.

Examples of the aforementioned pH-adjusting agent include sulfuric acid, nitric acid, acetic acid and other acids, and NaOH, $NH_3$ and other bases. The amount of pH-adjusting agent added should be regulated so that at the time that all of the pH-adjusting agent, Si-containing substance and P-containing substance are added, the pH becomes 9-12. However, if the method of adding the pH-adjusting agent first is adopted, the magnetic powder may dissolve if large amounts of acid are added, so the amount of the pH-adjusting agent must be regulated to a level that does not cause excessive dissolution. Examples of the Si-containing substance to be the adhered material include: sodium silicate, silicon alkoxide, colloidal silica, silane coupling agents and the like. Examples of the P-containing substance include: phosphoric acid, phosphates, phenylphosphonic acid, sodium hypophosphate and the like.

The amount of Si and P adhered is preferably 0.1% or greater as an atomic ratio with respect to Fe. Specifically, the M/Fe atomic ratio (where M is at least one or more of Si and P) is to become 0.1% or greater. When both elements are added, it is preferable for the total content to become 0.1% or greater. If the M/Fe atomic ratio is less than 0.1%, then an adequate effect of improving weatherability may not be obtained. On the other hand, the upper limit of the M/Fe atomic ratio is not particularly limited except that it is required to be in a range wherein the powder ultimately obtained does not become nonmagnetic, but it should preferably be within the range of 50% or less, for example. Realistically, a considerably large effect of improving weatherability is obtained when the M/Fe atomic ratio is in the range 0.1-10%.

The magnetic powder thus formed by adhering at least one or more of the elements Si and P or oxides thereof to the surface of an iron nitride-based magnetic powder is filtered and rinsed and then dried at a temperature less than 80° C. to obtain an iron nitride-based magnetic powder with improved weatherability. Note that in order to shorten the drying time, alcohol may be added after the rinse step, thus replacing the water adhering to the surface of the magnetic powder with alcohol. Examples of usable alcohols include methanol, ethanol, propanol, butanol or others, and there is no particular limitation, but alcohols with low molecular weights have low boiling points and their drying time is short and thus preferable.

The powder after this drying has considerably improved weatherability as is, but if it is subjected thereafter to heat treatment at 80-200° C. in an inert gas atmosphere, a further weatherability improvement effect is obtained. If the heat treatment is performed at a temperature lower than 80° C., then the weatherability improvement effect due to heat treatment may not be stably obtained. If the heat treatment is performed above 200° C., the oxide film and film of adhered Si and P may deteriorate so the weatherability improvement effect may again not be stably obtained. The heat treatment time may be roughly 1-5 hours.

EXAMPLES

Examples of embodiments of the present invention will now be described. First, however, the methods used to measure the property values obtained in the various embodiments will be explained.

Chemical Analysis

Quantitative analysis of the Fe within the magnetic powder was performed using a Hiranuma Automatic Titrator (COMTIME-980) from Hiranuma Sangyo Co., Ltd. In addition, quantitative analysis of the P within the magnetic powder was performed using a high-resolution inductively coupled plasma mass spectrometer (IRIS/AP) from Nippon Jarrel Ash. Quantitative analysis of the Si within the magnetic powder was performed by means of the weighing method recited in JIS M 8214. The results of these quantitative analyses are given in the form of percent by weight, so the ratios of all elements were first converted to the percent of atoms and then the Si/Fe atomic ratio or P/Fe atomic ratio was calculated.

Evaluation of the Powder Bulk Properties

Numerical-average grain size: a 30,000 transmission electron microphotograph was enlarged by 2 both horizontally and vertically and the longest dimensions of 400 magnetic particles shown thereon were measured, and these values were used to find an average.

Measurement of magnetic properties (coercivity $H_c$, saturation magnetization $\sigma_s$ and remanance $\sigma_r$): a vibrating sample magnetometer (VSM) (from Digital Measurement Systems, Inc.) was used to measure these properties in an externally applied magnetic field of a maximum strength of 796 kA/m.

Specific surface area: this was measured by the BET method.

Evaluation of Weatherability

The deterioration over time of the magnetic properties of each powder product was evaluated by acceleration testing. Specifically, the magnetic properties $H_{c0}$ and $\sigma_{s0}$ before acceleration testing were first measured by means of the methods of investigating magnetic properties given in the Powder Bulk Properties section above. Next, each powder product was kept for one week in a constant-temperature, constant-humidity vessel at 60° C. and 90% RH and then the $H_c$ and $\sigma_s$ of that powder were measured by means of the methods of investigating magnetic properties given in the Powder Bulk Properties section above, and the measured values thus obtained are called $H_{c1}$ and $\sigma_{s1}$. Then, the values $\Delta H_c$ and $\Delta\sigma_s$ were found according to Equations (1) and (2) below, and the weatherability was evaluated using these values. The smaller the values of $\Delta H_c$ and $\Delta\sigma_s$, the better the weatherability evaluation becomes.

$$\Delta H_c=(H_{c0}-H_{c1})/H_{c0}100 \quad (1)$$

$$\Delta\sigma_s=(\sigma_{s0}-\sigma_{s1})/\sigma_{s0}100 \quad (2)$$

Example 1

The iron nitride A shown in Table 1 was used as the starting material for the iron nitride-based magnetic powder. As a result of x-ray diffraction, iron nitride A was found to consist primarily of $Fe_{16}N_2$ and have an oxide layer thought to be $\gamma$-$Fe_2O_3$.

To 972.3 mL (where L indicates liters) of deionized water adjusted to 30° C. was added 10.4 g of $NH_3$ (giving an $NH_3$ concentration of 23.1 wt. %). Next, 10 g of iron nitride A was added under stirring and then 17.2 g of an aqueous solution of sodium silicate was added to give a Si concentration of 2 wt. %, whereafter stirring of the solutions was continued for 10 minutes. This slurry was filtered with a Büchner funnel and the filter cake was rinsed with 1 L of deionized water. Then, 500 mL of ethanol was added to the cake to replace the moisture within the cake with ethanol. The cake was dried at 40° C. in a nitrogen atmosphere. Then, the dried cake was heat-treated at 100° C. in a nitrogen atmosphere to obtain the desired Si-adhered iron nitride-based magnetic powder. As a result of chemical analysis, the Si content of the iron nitride-based magnetic powder thus obtained was found to be 3.2% as a Si/Fe atomic ratio. The properties of this iron nitride-based magnetic powder are presented in Table 2.

Figure 2:
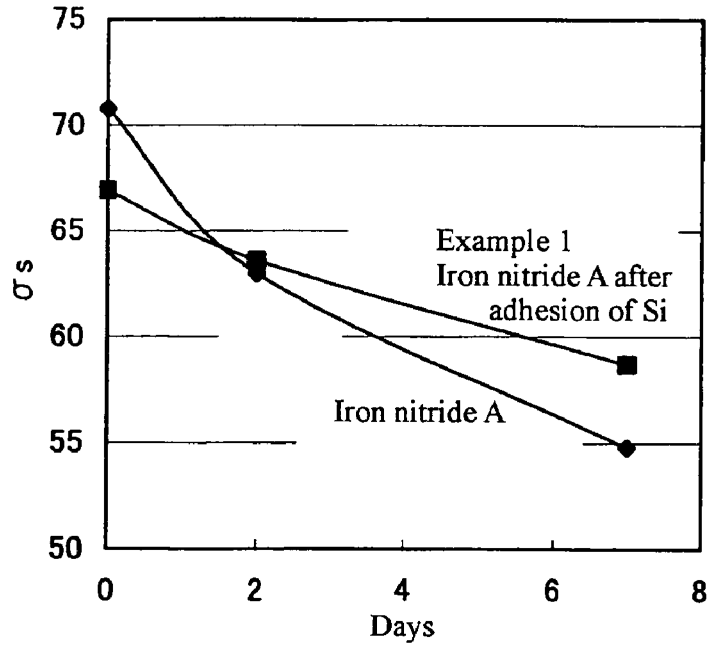
FIG. 2 is a graph of the deterioration over time of $\sigma_s$ when acceleration testing is performed in a constant-temperature, constant-humidity chamber, both on the iron nitride-based magnetic powder prior to the Si adhesion used in Example 1 (iron nitride A) and the iron nitride-based magnetic powder after Si adhesion produced in the same Example.

FIGS. 1 and 2 illustrate the changes over time in $H_c$ and $\sigma_s$, respectively, in the powder during acceleration testing in a constant-temperature, constant-humidity vessel both before and after the adhesion process was performed according to this Embodiment. One can see that the adhesion process lessened the changes in $H_c$ and $\sigma_s$, and thus improved weatherability.

Example 2

The iron nitride B shown in Table 1 was used as the starting material for the iron nitride-based magnetic powder, but other than this, the process of Example 1 was repeated. As a result of x-ray diffraction, this iron nitride B was also found to consist primarily of $Fe_{16}N_2$ and have an oxide layer thought to be $\gamma$-$Fe_2O_3$. As a result of chemical analysis, the Si content of the iron nitride-based magnetic powder obtained by the Si adhesion process was found to be 3.0% as a Si/Fe atomic ratio. The properties of this iron nitride-based magnetic powder are presented in Table 2.

Example 3

To 972.3 mL of deionized water at 30° C. was added 11.8 g of $NH_3$ (giving an $NH_3$ concentration of 23.1 wt. %). Next, 10 g of iron nitride A was added under stirring and then added 28.5 g of an aqueous solution of phosphoric acid was added to give a P concentration of 2 wt. %, whereafter stirring of the solution was continued for 10 minutes. Thereafter, the process of Example 1 was used to obtain a P-adhered iron nitride-based magnetic powder. As a result of chemical analysis, the P content of the iron nitride-based magnetic powder thus obtained was found to be 1.4% as a P/Fe atomic ratio. The properties of this iron nitride-based magnetic powder are presented in Table 2.

Comparative Example 1

The method recited in Example 15 of the aforementioned Patent Document 2, i.e., the method of adhering Si and Y to magnetite prior to nitriding and then performing nitriding, was used to obtain an iron nitride-based powder with an average grain size of 18 nm and a specific surface area of 56 $m^2/g$. The Si content of the iron nitride-based powder thus obtained was found to be 4.3% as a Si/Fe atomic ratio. The properties of this iron nitride-based magnetic powder are presented in Table 2.

Comparative Example 2

An iron nitride-based powder with an average grain size of 26 nm and a specific surface area of 46 $m^2/g$ was prepared by the same method as in Comparative Example 1. The Si content of the iron nitride-based powder thus obtained was found to be 5.1% as a Si/Fe atomic ratio. The properties of this iron nitride-based magnetic powder are presented in Table 2.

TABLE 1

(Iron nitride-based magnetic powder before the adhesion process)

| | Average grain size nm | BET $m^2/g$ | $H_c$ kA/m | $\sigma_s$ $Am^2/kg$ | $\sigma_s/\sigma_r$ | $\Delta H_c$ % | $\Delta\sigma_s$ % |
|---|---|---|---|---|---|---|---|
| Iron nitride A | 17 | 64 | 214 | 71 | 0.50 | 11.2 | 23.9 |
| Iron nitride B | 20 | 60 | 237 | 82 | 0.53 | 5.7 | 22.5 |

TABLE 2

(Iron nitride-based magnetic powder after Si or P adhesion)

| | Average grain size nm | BET $m^2/g$ | $H_c$ kA/m | $\sigma_s$ $Am^2/kg$ | $\sigma_s/\sigma_r$ | $\Delta H_c$ % | $\Delta\sigma_s$ % | Si/Fe at. % | P/Fe at. % |
|---|---|---|---|---|---|---|---|---|---|
| Example 1 | 17 | 62 | 210 | 67 | 0.50 | 3.5 | 12.3 | 3.2 | — |
| Example 2 | 20 | 58 | 232 | 78 | 0.52 | 1.2 | 11.6 | 3.0 | — |
| Example 3 | 17 | 59 | 209 | 68 | 0.50 | 4.8 | 17.4 | — | 1.4 |
| Comparative Example 1 | 18 | 56 | 153 | 61 | 0.50 | 13.7 | 41.0 | 4.3 | — |
| Comparative Example 2 | 26 | 46 | 237 | 111 | 0.52 | 0.6 | 27.9 | 5.1 | — |

Results of Weatherability Testing

As one can see upon comparing Table 1 and Table 2, the iron nitride-based magnetic powders with Si or P adhered obtained by means of Examples 1-3 according to the present invention exhibited a large decrease in the values of $\Delta H_c$ and $\Delta\sigma_s$ in comparison to the state prior to the adhesion of Si or P (iron nitride A or B), so a marked effect of improving weatherability was confirmed.

Figure 3:
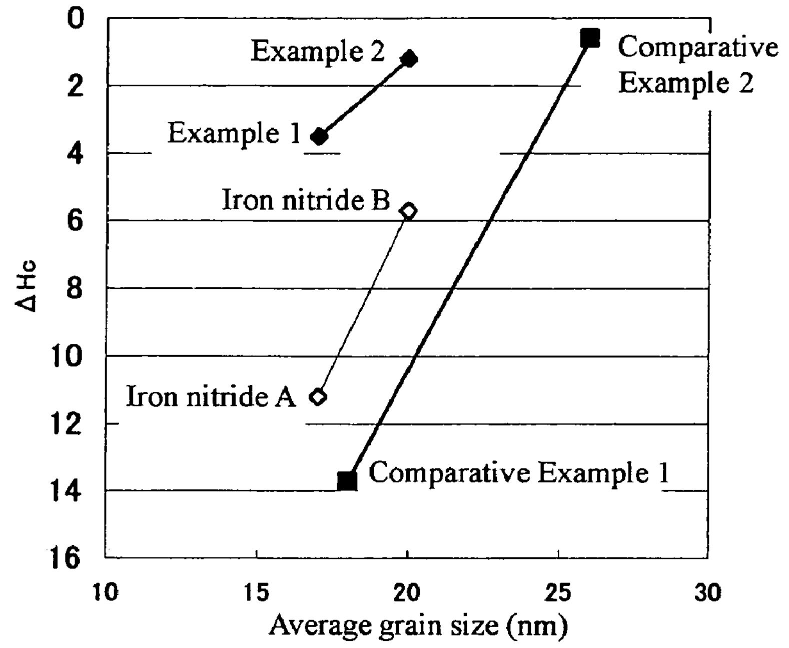
FIG. 3 is a graph of the $\Delta H_c$ as a function of the average grain size in the powders of iron nitrides A and B with no Si or such adhered, and Examples 1 and 2 and Comparative Examples 1 and 2 with Si adhered.
Figure 4:
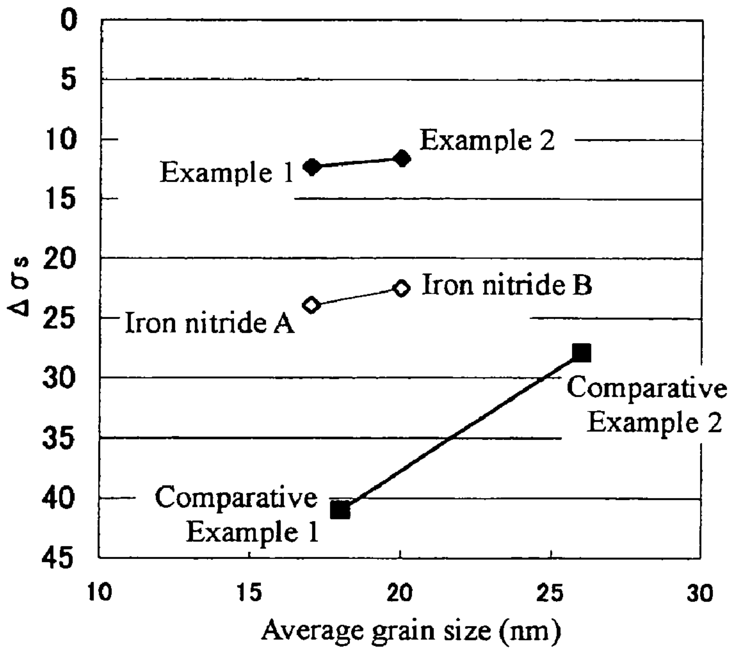
FIG. 4 is a graph of the $\Delta\sigma_s$ as a function of the average grain size in the powders of iron nitrides A and B with no Si or such adhered, and Examples 1 and 2 and Comparative Examples 1 and 2 with Si adhered.

FIG. 3 and FIG. 4 illustrate the $\Delta H_c$ as a function of the average grain size and the $\Delta\sigma_s$ as a function of the average grain size, respectively, in the powders of iron nitrides A and B with no Si or such adhered, and Examples 1 and 2 and Comparative Examples 1 and 2 with Si adhered. From these graphs, one can see that improvement of the weatherability becomes more difficult the smaller the grain size becomes. However, upon comparing the same grain sizes, one can see that the powders of Examples 1 and 2 wherein Si was adhered after nitriding exhibited greatly reduced values of $\Delta H_c$ and $\Delta\sigma_s$ and thus had superior weatherability in comparison to those according to the Comparative Examples that were produced by the conventional method wherein Si was adhered before nitriding.

What is claimed is:

1. A high-weatherability iron nitride-based magnetic powder comprising iron nitride-based magnetic particles constituted primarily of $Fe_{16}N_2$ with an average grain size of 20 nm or less, wherein a substance containing one or more of the elements Si and P are adhered to the surface of the $Fe_{16}N_2$ particles after the particles have been formed, the total content of Si and P in the magnetic powder after adhesion is 0.1% or greater as an atomic ratio with respect to Fe, and the value $\Delta H_c$ as defined by Equation (1) below is 5% or less:

$$\Delta H_c = (H_{c0} - H_{c1})/H_{c0} \times 100 \quad (1)$$

where, $H_{c0}$ is the coercivity (kA/m) of the iron nitride-based magnetic powder after adhesion, and $H_{c1}$ is the coercivity (kA/m) of the iron nitride-based magnetic powder after adhesion and after being kept for one week in a constant-temperature, constant-humidity vessel at 60° C. and 90% RH.

2. The high-weatherability iron nitride-based magnetic powder according to claim 1, wherein the value $\Delta\sigma_s$ as defined by Equation (2) below is 20% or less:

$$\Delta\sigma_s = (\sigma_{s0} - \sigma_{s1})\sigma_{s0} \times 100 \quad (2)$$

where, $\sigma_{s0}$ is the saturation magnetization ($Am^2/kg$) of the iron nitride-based magnetic powder after adhesion, and $\sigma_{s1}$ is the saturation magnetization ($Am^2/kg$) of the iron nitride-based magnetic powder after adhesion and after being kept for one week in a constant-temperature, constant-humidity vessel at 60° C. and 90% RH.

3. A method of manufacturing a high-weatherability iron nitride-based magnetic powder comprising a step of taking an iron nitride-based magnetic powder constituted primarily of $Fe_{16}N_2$ with an average grain size of 20 nm or less and adhering one or more of the elements Si and P to the surface of the powder such that the total content of Si and P in the magnetic powder after adhesion is 0.1% or greater as an atomic ratio with respect to Fe, wherein the adhering step further comprises dispersing the iron nitride-based magnetic nowder in water, and adding to the dispersion one or more of a Si-containing substance and a P-containing substance so that one or more of the elements Si and P adhere to the surface of the powder, wherein a pH adjusting agent is added either to the water prior to the adding step, is added to the dispersion after the adding step, or is added to the dispersion with the one or more of the Si-containing substance and the P-containing substance, and further drying the particles obtained at a temperature less than 80° C.

4. A method of manufacturing a high-weatherability iron nitride-based magnetic powder according to claim 3, wherein a step of heat treating the powder obtained in the adhering step at 80-200° C. in an inert-gas atmosphere follows the drying step.

* * * * *